United States Patent
Kang et al.

(10) Patent No.: US 9,258,094 B2
(45) Date of Patent: Feb. 9, 2016

(54) CHANNEL STATE INFORMATION FEEDBACK METHOD AND APPARATUS IN A MULTI-NODE SYSTEM

(75) Inventors: Ji Won Kang, Anyang-si (KR); Jin Young Chun, Anyang-si (KR); Ki Tae Kim, Anyang-si (KR); Su Nam Kim, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 278 days.

(21) Appl. No.: 14/112,851

(22) PCT Filed: Apr. 20, 2012

(86) PCT No.: PCT/KR2012/003036
§ 371 (c)(1),
(2), (4) Date: Dec. 11, 2013

(87) PCT Pub. No.: WO2012/144841
PCT Pub. Date: Oct. 26, 2012

(65) Prior Publication Data
US 2014/0086187 A1 Mar. 27, 2014

Related U.S. Application Data

(60) Provisional application No. 61/478,042, filed on Apr. 21, 2011.

(51) Int. Cl.
*H04L 5/00* (2006.01)
*H04L 1/00* (2006.01)

(52) U.S. Cl.
CPC ............ *H04L 5/0051* (2013.01); *H04L 1/0026* (2013.01)

(58) Field of Classification Search
CPC . H04L 12/1881; H04L 12/189; H04L 5/0051; H04L 5/005; H04L 25/0224; H04W 4/08; H04W 84/18; H04W 8/186; H04B 7/0452
See application file for complete search history.

(56) References Cited

U.S. PATENT DOCUMENTS 8,861,418 B2 * 10/2014 Wu ....................... H04W 8/186
370/312
2005/0207441 A1 * 9/2005 Onggosanusi .......... H04L 5/023
370/464

(Continued)

OTHER PUBLICATIONS

Ericsson et al., "Baseline Schemes and Focus of CoMP Studies", 3GPP TSG-RAN WG1 #63bis, Agenda Item: 6.3.1.2, Dublin, Ireland, Jan. 17-21, 2011, 2 pages, R1-110461.

(Continued)

*Primary Examiner* — Hoang-Chuong Vu
(74) *Attorney, Agent, or Firm* — Birch, Stewart, Kolasch & Birch, LLP

(57) ABSTRACT

A method and apparatus of feeding back channel state information in a multi-node system are provided. The method includes receiving a reference signal of N nodes, wherein N is a natural number equal to or more than 2, aligning the N nodes in an order of preferring the N nodes based on a result of measuring the reference signal, generating channel state information for the aligned nodes, and transmitting the generated channel state information to the base station, wherein the channel state information is generated with respect to N node combinations configured from the aligned nodes, and wherein the N node combinations are obtained by adding next highest-priority nodes to a first node combination one by one, the first node combination consisting a highest-priority node among the aligned nodes.

13 Claims, 4 Drawing Sheets

(56) References Cited

U.S. PATENT DOCUMENTS

| | | | | |
|---|---|---|---|---|
| 2009/0016317 A1* | 1/2009 | Wu | ............... | H04W 72/10 370/347 |
| 2010/0056171 A1* | 3/2010 | Ramprashad | ......... | H04W 16/10 455/452.1 |
| 2010/0254473 A1* | 10/2010 | Wu | ............... | H04B 7/0434 375/267 |
| 2010/0265842 A1* | 10/2010 | Khandekar | ....... | H04W 72/0433 370/252 |
| 2010/0322351 A1 | 12/2010 | Tang et al. | | |
| 2011/0009125 A1 | 1/2011 | Shin et al. | | |
| 2011/0130099 A1* | 6/2011 | Madan | ............. | H04W 72/1226 455/63.1 |

OTHER PUBLICATIONS

3GPP TSG RAN WG1 Meeting #63bis, R1-110233, "Overview of CoMP schemes for study," Alcatel-Lucent, Alcatel-Lucent Shanghai Bell, Jan. 17-21, 2011, pp. 1-2.

* cited by examiner

9,258,094 B2

CHANNEL STATE INFORMATION FEEDBACK METHOD AND APPARATUS IN A MULTI-NODE SYSTEM

CROSS REFERENCE TO RELATED APPLICATIONS

This application is the National Phase of PCT/KR2012/003036 filed on Apr. 20, 2012, which claims priority under 35 U.S.C. §119(e) to U.S. Provisional Application No. 61/478,042 filed on Apr. 21, 2011, all of which are hereby expressly incorporated by reference into the present application.

TECHNICAL FIELD

Embodiments of the present invention are directed toward radio communications, and more specifically to a method and apparatus of feeding back channel state information in a multi-node system.

BACKGROUND ART

The recent advent of M2M (Machine-to-Machine) available and high data processing devices including smart phones or tablet PCs has led to an increase in data transmission over a wireless communication network. To satisfy increasing data transmission, more attention is being directed toward cognitive radio (CR) and carrier aggregation (CA) for efficient use of more frequency bands and multi base station collaborative and multi antenna technologies for increasing data capability within a limited frequency resource.

The wireless communication network is evolving to have a higher density of nodes accessible by a user. The "node", which is sometimes referred to as an antenna or antenna group spaced apart from a distributed antenna system (DAS), may have a broader meaning. For example, the node may be one of a macro base station, pico cell base station (PeNB), home base station (HeNB), RRH (Remote Radio Head), RRU (Remote Radio Unit), relay, or distributed antenna (group).

With a higher density of nodes, a wireless communication system may exhibit higher system capability through collaboration between the nodes. For example, even more excellent system capacity can be achieved when each node operates as an antenna or antenna group for one cell while its transmission/reception is managed by one control station rather than when each node operates without cooperation with another with respect to a base station. Hereinafter, a wireless communication system including multiple nodes is referred to as a "multi-node system."

In a multi-node system, a base station may assign a node set to a terminal in a semi-static or static manner. The base station may dynamically select the nodes included in a subset of the node set and may transmit a signal to the selected nodes. In such case, to select the optimum nodes, the base station theoretically requires channel state information for all the subsets included in the node set. If the terminal feeds back the channel state information for all the sub sets to achieve such purpose, the calculation of the terminal may be more complicated together with more consumption of resources for feedback information.

There is a need of a channel state information feedback device and method that can optimize capability of a multi-node system.

SUMMARY OF INVENTION

Technical Problem

There are provided a channel state information feedback device and method for a multi-node system.

Solution to Problem

A method of feeding back channel state information of a user equipment (UE) in a multi-node system is provided. The method comprises receiving a reference signal of N nodes, wherein N is a natural number equal to or more than 2; aligning the N nodes in an order of preferring the N nodes based on a result of measuring the reference signal; generating channel state information for the aligned nodes; and transmitting the generated channel state information to the base station, wherein the channel state information is generated with respect to N node combinations configured from the aligned nodes, and wherein the N node combinations are obtained by adding next highest-priority nodes to a first node combination one by one, the first node combination consisting a highest-priority node among the aligned nodes.

when N is 3, and node 1, node 2, and node 3 are aligned in an order of the node 1, the node 2, and the node 3, the N node combinations include {node 1}, {node 1, node 2}, and {node 1, node 2, and node 3}.

The method further comprises: receiving channel state information (CSI) feedback node set information from the base station, the CSI feedback node set information indicating a node set to which the channel state information is generated, wherein the CSI feedback node set information directly indicates the N nodes or a value of N.

The method further comprising: receiving information on the maximum number of assignable nodes from the base station, wherein the information on the maximum number of assignable nodes indicates the maximum number of nodes to which the UE can generate the channel state information.

In channel state information for the N node combinations, channel state information for an n+1th node combination includes a differential value from channel state information for an nth node combination, wherein n is any one of 1 to N−1.

The number of bits of a field for transmitting the channel state information for the n+1th node combination is equal to or less than the number of a field for transmitting the channel state information for the nth node combination.

In channel state information for the N node combinations, a differential value between channel state information for an n+1th node combination and channel state information for an nth node combination is configured as a predetermined table.

The channel state information for the n+1th node combination and the channel state information for the nth node combination are transmitted as index values in the predetermined table.

When the N nodes include a plurality of types, the UE selects as a highest-priority node any one of nodes having a signal characteristic of a predetermined threshold or more among a predetermined type of nodes of the plurality of types of nodes.

The plurality of types of nodes are distinguished from each other based on transmission power of the nodes.

The plurality of types of nodes include high-power nodes having relatively high transmission power and low-power nodes having relatively low transmission power, wherein the high-power nodes use a cell-specific reference signal common for all UEs in a cell, and the low-power nodes use a UE-specific reference signal applied to a particular UE.

The channel state information includes at least one of a channel quality indicator (CQI) indicating channel quality, a pre-coding matrix index (PMI) providing information on a pre-coding matrix in codebook-based pre-coding, or a rank indicator (RI) which is information on the number of layers recommended by the UE.

A user equipment (UE) is provided. The UE comprises an RF unit configured to transmit and receive a wireless signal; and a processor connected to the RF unit, the processor is configured to receive a reference signal of N nodes, wherein N is a natural number equal to or more than 2, to align the N nodes in an order of preferring the N nodes based on a result of measuring the reference signal, to generate channel state information for the aligned nodes, and to transmit the generated channel state information to the base station, wherein the processor is configured to generate the channel state information with respect to N node combinations configured from the aligned nodes, and wherein the N node combinations are obtained by adding next highest-priority nodes to a first node combination one by one, the first node combination consisting a highest-priority node among the aligned nodes.

Advantageous Effects of Invention

The embodiments of the present invention can enhance efficiency in use of uplink resources by reducing channel state information amount fed back by a terminal. The embodiments of the present invention enable a decrease in power consumption as well as easy implementation of a terminal by reducing calculation complexity of the terminal.

MODE FOR THE INVENTION

Embodiments of the present invention may be used for various multiple access schemes, such as CDMA (code division multiple access), FDMA (frequency division multiple access), TDMA (time division multiple access), OFDMA (orthogonal frequency division multiple access), or SC-FDMA (single carrier-frequency division multiple access).

CDMA may be implemented as UTRA (Universal Terrestrial Radio Access) or CDMA2000. TDMA may be implemented as GSM (Global System for Mobile communications)/GPRS (General Packet Radio Service)/EDGE (Enhanced Data Rates for GSM Evolution). OFDMA may be implemented as IEEE (Institute of Electrical and Electronics Engineers) 802.11 (Wi-Fi), IEEE 802.16 (WiMAX), IEEE 802.20, or E-UTRA(Evolved UTRA). UTRA is part of UMTS (Universal Mobile Telecommunications System). 3GPP (3rd Generation Partnership Project) LTE (Long Term Evolution), part of E-UMTS (Evolved UMTS) using E-UTRA, adopts OFDMA for downlink and SC-FDMA for uplink. LTE-A (Advanced) is an advanced version of LTE. IEEE 802.16m is an advanced version of IEEE 802.16e.

Figure 1:
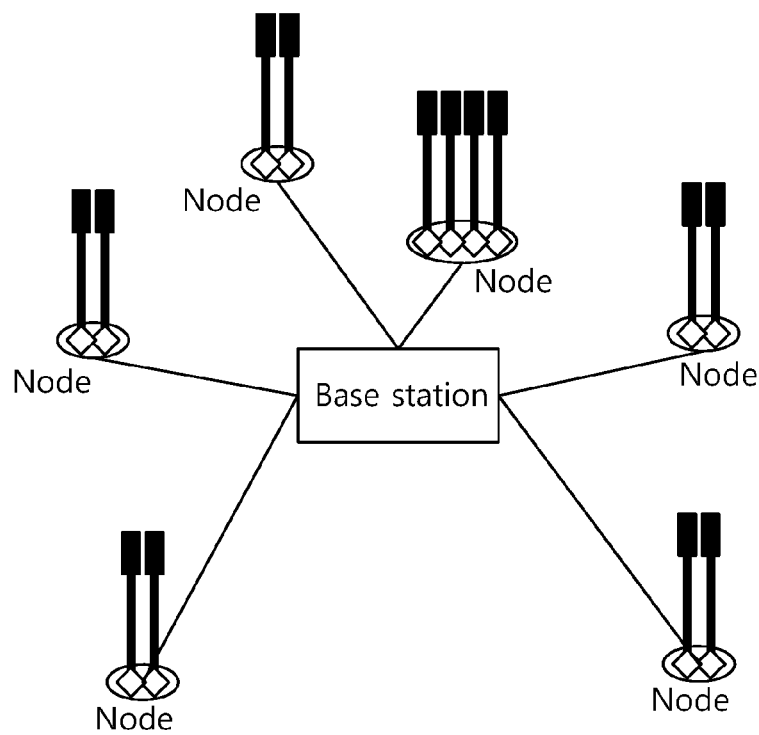
FIG. 1 illustrates an example of a multi-node system.

FIG. 1 illustrates an example of a multi-node system.

The multi-node system includes a base station (BS) and a plurality of nodes.

The base station provides a communication service in a particular geographical region. In general, the base station is a fixed station that communicates with a terminal, and is often called "eNB (evolved-NodeB)", "BTS (Base Transceiver System)", or "ABS (Advanced Base Station)".

The node refers to a communication device that is wiredly or wirelessly controlled by the base station, and may communicate with the base station or a terminal (a terminal may be called by other terminologies such as a user equipment (UE), mobile station (MS), subscriber station (SS), etc). The node sometimes means an antenna or antenna group distributed in an area which is subjected to control of the base station in a distributed antenna system (DAS). However, the node is not limited as having such meanings, and may be implemented as a macro base station, pico cell base station (PeNB), home base station (HeNB), RRH (Remote Radio Head), RRU (Remote Radio Unit), or relay. In some cases, the node may be referred to as a point.

From the point of view of a terminal, the node may be identified or indicated by a reference signal (RS) or a pilot signal. The reference signal (or pilot signal) means a signal that is known by a transmission terminal and a reception terminal and that is used for channel measurement or data demodulation. The reference signal includes a common reference signal (CRS) known to all the terminals located within an area controlled by the base station and a dedicated reference signal. The CRS is also referred to as a cell-specific RS, and the dedicated RS is also referred to as a UE-specific RS.

The reference signal includes a CRS (Common Reference Signal) and CSI-RS (Channel Status Indication-Reference Signal) as specified in 3GPP LTE-A and a preamble and midamble as specified in IEEE 802.16m. The reference signal or the configuration for the reference signal may be mapped to each node (or a transmission antenna of each node).

If mapping information between the reference signal configuration and the node is given to the terminal or previously known to the terminal, the terminal may identify or receive an indication on the node based on the CSI-RS configuration and may obtain channel state information on the node. The reference signal configuration may include information on reference signal configuration indexes, antenna ports of each node and the number of the antenna ports, used resource elements (REs), transmission period, and offset of transmission time. Accordingly, for convenience of description, as used herein, the phrase "a terminal measures a signal with respect to a particular node or generates channel state information" may mean that a certain reference signal is measured or channel state information is generated from the point of view of the terminal.

The nodes may be classified into high-power nodes and low-power nodes. The high-power nodes may transmit signals to the terminal with high transmission power, and the low-power nodes may transmit signals to the terminal with low transmission power.

For example, the multi-node system may be configured in a heterogeneous network where the low-power nodes having low transmission power are included in coverage of the high-power nodes having high transmission power. Each node may have an identical or different cell ID to/from the base station. When each node has the same cell ID as the base station, this system may be called "single cell multi-node system".

When each node has a different cell ID from the base station, this system may be called "multi cell system". The cell ID may be used for a seed number upon transmission of a synchronization signal or a reference signal, and the terminal may identify the cell ID of each node through the synchronization signal or reference signal.

In the multi-node system, the base station may configure a node set for the terminal in a static or semi-static manner. The base station may then transmit data to the terminal using any number of nodes in the node set. In this procedure, the base station may vary the node whenever data is transmitted to the terminal. Such dynamic variation of the node is referred to as "dynamic node assignment". The dynamic node assignment enables a combination of nodes to be transmitting data to the terminal to be flexibly changed depending on the terminal distribution or data traffic.

The dynamic node assignment required channel state information (CSI) of the terminal. The channel state information includes a CQI (Channel Quality Indicator), a PMI (Pre-coding Matrix Index), and a RI (Rank Indicator). The CQI provides information on link-adaptive parameters that may be supported by the terminal within a given time and indicates channel quality. The PMI provides information on a pre-coding matrix in a codebook based pre-coding. The RI provides information on the number of layers recommended by the terminal. For example, the RI indicates the number of streams used for spatial multiplexing.

The terminal feeds back the channel state information while not aware of which nodes in the node set, i.e., which sub set is to be used for data transmission. Accordingly, the terminal feeds back the channel state information of all of the node combinations (i.e., all the sub sets) included in the node set.

Figure 2:
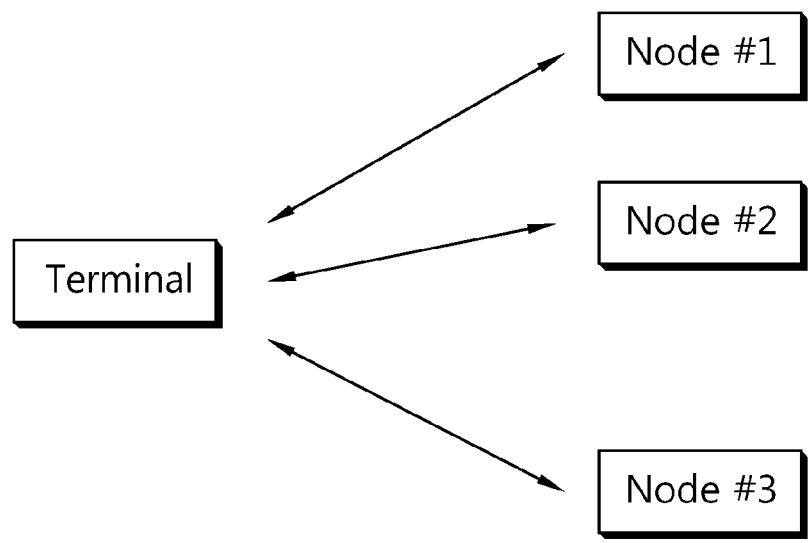
FIG. 2 illustrates an example where the base station sets a node set including three nodes for the terminal.

FIG. 2 illustrates an example where the base station sets a node set including three nodes for the terminal.

In the case that as shown in FIG. 2 the base station configures a node set including a plurality of nodes for the terminal, the following CSI is required for the base station to theoretically select an optimum node combination:

1. CSI for each individual node

The terminal may need to feed back $PMI_1$, $RI_1$, and $CQI_1$ for node #1, $PMI_2$, $RI_2$, and $CQI_2$ for node #2, and $PMI_3$, $RI_3$, and $CQI_3$ for node #3.

2. CSI when it is assumed that among three nodes, any two nodes are used as a node combination For convenience of description, assume that $PMI_{XY}$, $RI_{XY}$, and $CQI_{XY}$ are respectively PMI, RI, and CQI when the base station uses nodes X and Y. The terminal may need to feed back $PMI_{12}$, $PMI_{23}$, $PMI_{13}$, $RI_{12}$, $RI_{23}$, $RI_{13}$, $CQI_{12}$, $CQI_{23}$, and $CQI_{13}$.

Also, the terminal may feed back $CPMI_{XY}$. $CPMI_{XY}$ means CPMI (Concatenating PMI) when nodes X and Y are used. CPMI is information used to couple two or more different pre-coding matrixes to make a single pre-coding matrix. In the codebook, each pre-coding matrix is configured such that the phase of a coefficient corresponding to a first antenna becomes 0 (i.e., such that only real number components are present). Accordingly, to couple two ore more different pre-coding matrixes, differences in phases of the first components in the pre-coding matrixes need to be corrected. For this purpose, information called "CPMI" is used. For example, in IEEE 802.16m, three bits are assigned to CPMI so that any one of eight phases ($2\pi*(n/8)$, n=0, . . . , 7) can be indicated.

When the terminal feeds back $CPMI_{XY}$, $PMI_{XY}$ may be omitted. On the contrary, when $PMI_{XY}$ is fed back, $CPMI_{XY}$ may be omitted. Further, any one of $CPMI_{12}$, $CPMI_{23}$, and $CPMI_{13}$ may be inferred from the other two, and may be thus omitted.

3. CSI when all of the three nodes are used

If $PMI_{XYZ}$, $RI_{XYZ}$, and $CQI_{XYZ}$ respectively represent PMI, RI, and CQI when nodes X, Y, and Z are used, the terminal may need to feed back $PMI_{123}$, $RI_{123}$, and $CQI_{123}$.

If the terminal feeds back CPMI, in case that among $\{CPMI_{12}, CPMI_{13}\}$, $\{CPMI_{12}, CPMI_{23}\}$, and $\{CPMI_{13}, CPMI_{23}\}$ CPMIs for the two nodes are transmitted, overlapping information may be omitted, and also may be omitted when $PMI_{123}$ is fed back.

FIG. 2 shows CSI that the terminal needs to feed back when a node set including three nodes is set for the terminal. This may be expanded to a further generalized case. For example, if the base station sets a node set including M nodes and requests CSI feedback regarding this node set, the terminal needs to consider a node combination as follows:

$$\sum_{k=1}^{M} \binom{M}{k} = 2^M - 1 \qquad \text{[Equation 1]}$$

In Equation 1, $$\binom{a}{b}$$

represents the number of cases when b nodes are selected from a nodes.

As described above, the terminal needs to CSI for all node combinations (i.e., $2^M-1$) that may be selected by the base station with respect to the node set. The base station selects a particular node set based on the CSI, configures a pre-coding matrix and determines MCS (modulation and coding scheme), and transmits a downlink signal to the terminal. If as described above CSI for all the node combinations is fed back by the terminal, consumption of resources for CSI feedback (physical uplink control channel (PUCCH) or physical uplink shared channel (PUSCH) resources in an LTE system), together with calculation complexity of the terminal, severely grows up, thus increasing power consumption.

According to an embodiment, a feedback method for a multi-node system is now described.

Figure 3:
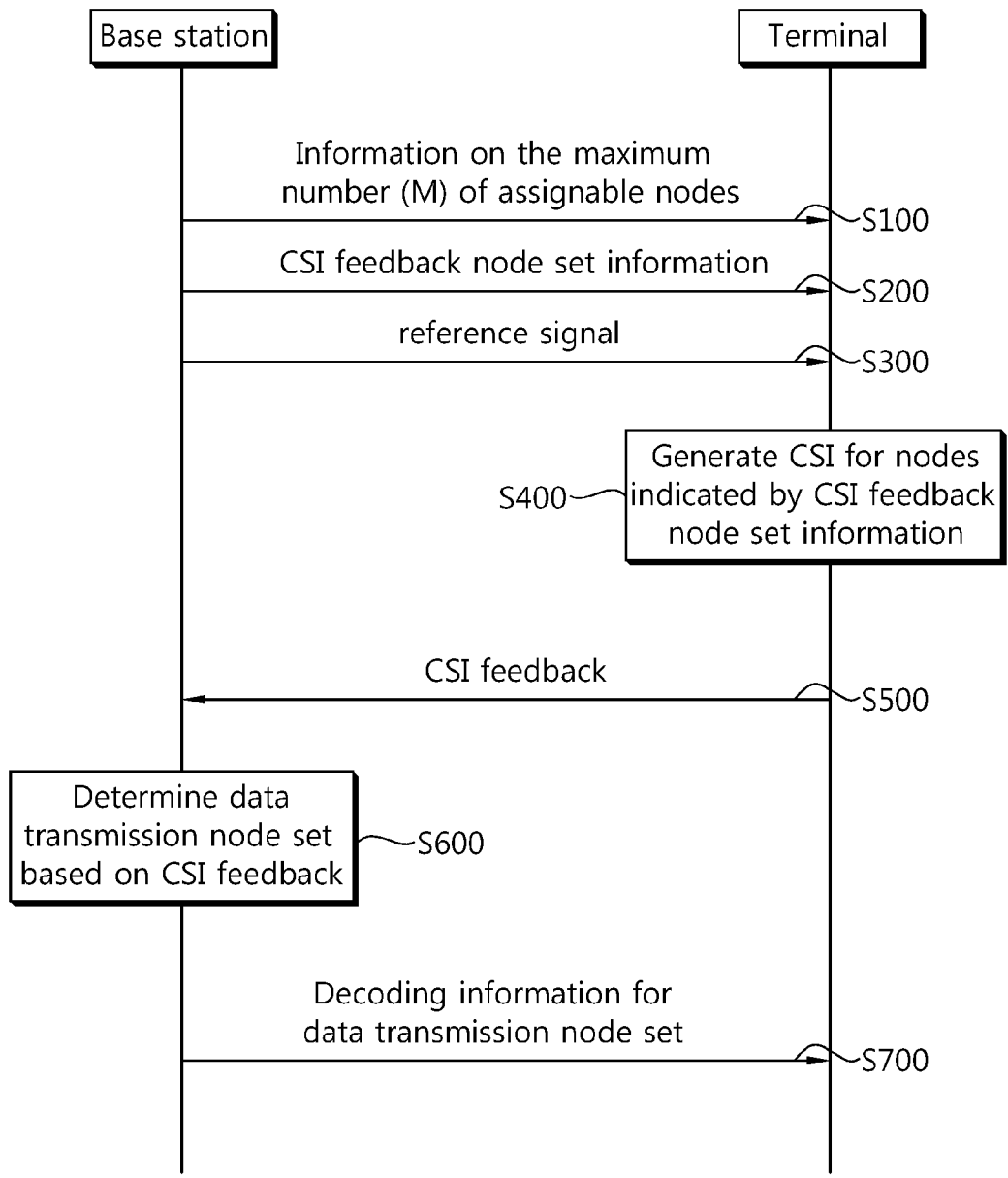
FIG. 3 illustrates a CSI feedback method for a multi-node system according to an embodiment of the present invention.

FIG. 3 illustrates a CSI feedback method for a multi-node system according to an embodiment of the present invention.

Referring to FIG. 3, the base station transmits information on the maximum number of assignable nodes to the terminal (S100).

The information on the maximum number of assignable nodes refers to the maximum number (M) of nodes that may simultaneously transmit data or PDSCH (Physical Downlink Shared Channel) to the terminal irrespective of the total number of nodes present in a cell or the number of nodes that are actually controlled by the base station. The maximum number of assignable nodes represents the maximum number of nodes for which the terminal is to perform CSI feedback. Hereinafter, a node set including the maximum number of nodes for which the terminal is to perform CSI feedback is referred to as "maximum CSI feedback node set". The maximum number (M) of assignable nodes refers to the size of the maximum CSI feedback node set.

The information on the maximum number of assignable nodes may be transmitted through a higher layer signal, such as MIB (Master Information Block) or SIB (System Information Block), or may be included in DCI (Downlink Control Information) that is transferred to the terminal through PDCCH (Physical Downlink Control Channel). MIB is information transmitted through a broadcast channel such as PBCH (Physical Broadcast Channel), and in the LTE system, MIB is transmitted through four foremost OFDM (Orthogonal Frequency Division Multiplexing) symbols of a second slot of a first subframe in a radio frame. SIB is system information transmitted over PDSCH indicated by PDCCH which is a control channel. DCI indicates downlink control information transmitted through PDCCH.

Alternatively, the information on the maximum number of assignable nodes may not be explicitly signaled. For example, if the maximum number of nodes assignable to the terminal is previously specified in a communication standard, the information on the maximum number of assignable nodes need not be signaled.

The base station transmits the CSI feedback node set information to the terminal (S200).

The CSI feedback node set information directly indicates nodes as a target for which the terminal needs to generate CSI or the number of the target nodes. When the number of the target nodes indicated by the CSI feedback node set information is N, and the afore-mentioned maximum number of assignable nodes is M, N≤M.

The CSI feedback node set information may be signaled more often than the information on the maximum number of assignable nodes. The information on the maximum number of assignable nodes is cell-specific control information while the CSI feedback node set information is UE-specific control information.

The base station transmits reference signals to the terminal through each node (S300). The number of reference signals to be sent to the terminal may be determined based on the CSI feedback node set information. For example, in the LTE system, N CSI-RSs may be transmitted to the terminal as the reference signals. In such case, the CSI feedback node set information may include configuration information (i.e. number of antenna ports, transmission resource location information, etc.) of the N CSI-RSs. The terminal generates CSI for the nodes indicated by the CSI feedback node set information (S400). Alternatively, the terminal selects as many nodes as indicated by the CSI feedback node set information and generates CSI. In this process, the terminal generates CSI for N node combinations rather than ($2^N$−1) node combinations, reducing feedback information amount. This process will be described below with reference to FIG. 4.

The terminal feeds CSI back to the base station (S500).

The base station determines a data transmission node set through which data is to be sent to the terminal (S600) and transmits decoding information on the data transmission node set to the terminal (S700). For example, the base station may transmit through PDCCH to the terminal the number of transmission layers applying to each node in the data transmission node set, reference signal information (e.g. antenna ports), or pre-coding matrix.

Figure 4:
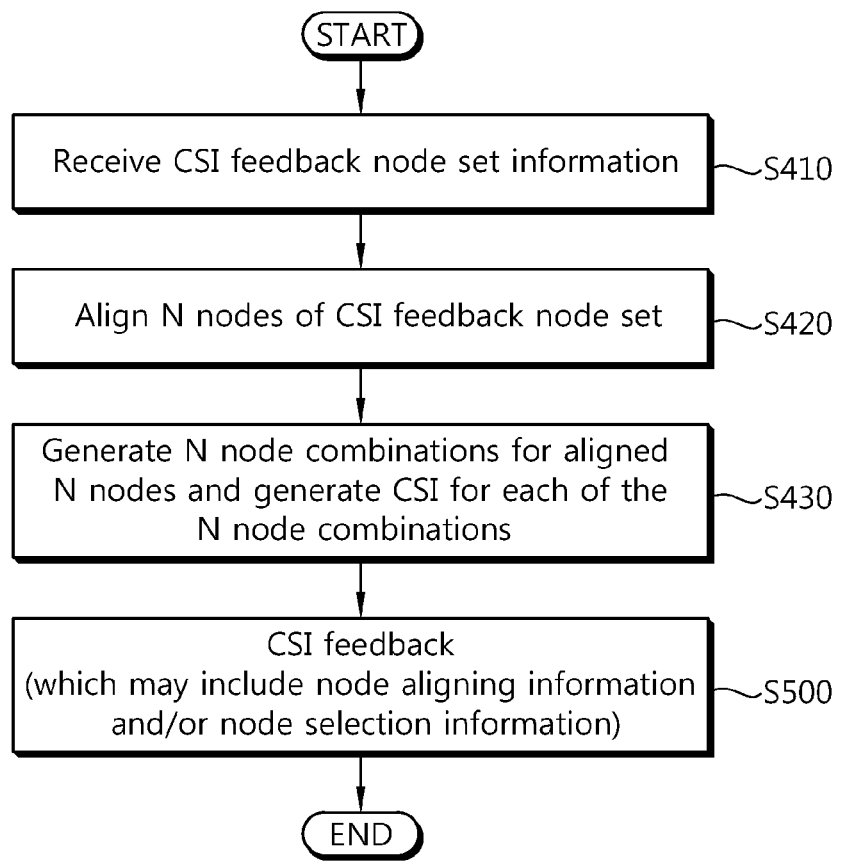
FIG. 4 illustrates an example where the terminal generates CSI.

With reference to FIG. 4, it is described how the terminal generates CSI for the CSI feedback node set including N nodes.

FIG. 4 illustrates an example where the terminal generates CSI.

Referring to FIG. 4, the terminal receives the CSI feedback node set information (S410), and then aligns the (N) nodes included in the CSI feedback node set (S420).

The terminal may align the nodes according to various references. For example, the terminal may align the nodes in order from higher capability to lower capability based on signal strength or quality, such as path loss, SNR (Signal to Noise Ratio), SINR (Signal to Interference plus Nose Ratio) of a transmission signal for each node. In an embodiment, since the CSI feedback node set information indicates N nodes, the terminal may align the N nodes based on signal strength or quality, such as $RRH_1, RRH_2, \ldots, RRH_N$. In such case, $RRH_1$ may have the highest priority, and $RRH_N$ may have the lowest priority.

The terminal generates N node combinations for the aligned N nodes and generates CSI for each of the N node combinations (S430).

For example, the terminal may generate N node combinations, such as $\{RRH_1\}$, $\{RRH_1, RRH_2\}$, $\{RRH_1, RRH_2, RRH_3\}$, ..., $\{RRH_1, \ldots, RRH_N\}$, e.g., by adding lower-priority nodes to the highest priority node one by one. The terminal then generates CSI for each node combination. For example, the terminal generates CSI for a case where $RRH_1$ alone transmits a signal with respect to $\{RRH_1\}$. With respect to $\{RRH_1, \ldots, RRH_X\}$, the terminal generates CSI for a case where $RRH_1, \ldots, RRH_X$ simultaneously transmit signals (X is one of 2 to N).

In the case that only one node is used, the highest-priority node $RRH_1$ is more likely to be used than the other nodes. Also, if two nodes alone are used, the highest-priority node $RRH_1$ and the second highest-priority node $RRH_2$ are more likely to be used than the others. Accordingly, a node combination targeted to be CSI generated is restricted to one likely to be used most frequently.

CSI for each node combination includes at least one of PMI for each node, the whole PMI, RI, CQI, and CPMI. Each CSI may be measured for whole frequency band (e.g., wideband PMI/CQI/RI) or for a particular frequency band (e.g., sub-band PMI/CQI/RI).

Also, the CSI feedback information may include node alignment information and/or node selection information. The node alignment information indicates priorities (e.g., preferences) of nodes selected by the terminal, and the node selection information indicate nodes selected by the terminal. In other words, the node selection information and the node alignment information indicate priorities of nodes selected by the terminal to the base station.

Assume that while the base station signals only the information on the maximum number (M) of assignable nodes, the terminal selects any N nodes, performing feedback. Or assume that the base station indicates only N without indicating a particular node through the CSI feedback node set information. In such case, the base station is aware of only the cell-specifically indexed node information, but is not aware of what node the terminal prefers or of the priorities of the nodes. Accordingly, the terminal needs to send the node selection information and/or node alignment information to the base station. The node alignment information and the node selection information may be signaled by one of the following two methods.

The first method is described. Assume that among cell-specifically indexed K nodes, N nodes are selected and fed back. For example, K may be 6, and N may be 3. In other words, this is a case where among six nodes which are cell-specifically indexed by 1 to 6, three preferred nodes are selected by the terminal. It is assumed that the three nodes are respectively node #2, node #1, and node #4. Then, the terminal may send the node alignment information and the node selection information by signaling {2, 1, 4}.

The second method is that the terminal signals the node alignment information and the node selection information using a field having a fixed size. For example, if K nodes are present in a cell, and M is designated as the maximum number of nodes assignable by the base station, the terminal generates bit streams by assigning bits to K nodes in the cell-specific node index order. For example, the terminal may generate bit streams by assigning ceil ($\log_2$ M) bits to each node. The ceil (x) indicates the smallest integer equal to x or larger than x. The terminal may provide the node alignment information and the node selection information through bits corresponding to a node of interest in the bit stream. For example, assume that total six (=K) nodes are present in the cell, and the base station sets M=4. In such case, the terminal may assign the ceil ($\log_2$ 4) bits to each node.

Then, a bit stream, such as $\{x_1x_1x_2x_2x_3x_3x_4x_4x_5x_5x_6x_6\}$, is generated. In this bit stream, Xn means a bit reserved for nth node (n is a cell-specific node index). Assume that the base station sets the size of the CSI feedback node set as 3. In such case, when the terminal indicates the preferences of the three nodes in the order of node #2, node #1, and node #4, 1, 2, and 3 (1, 2, 3 are decimal number) may be respectively transmitted for bits corresponding to node #2, bits corresponding to node #1, and bits corresponding to node #4. That is, the terminal may transfer {100100110000}.

In the first method, the total feedback amount is N×ceil ($\log_2$ K) while in the second method, the total feedback amount is K×ceil ($\log_2$ M). Accordingly, regardless of the size (N) of the set CSI feedback node set, a constant information amount is provided in the second method.

The node selection information and the node alignment information may be fed back separately from each other, or if the node selection information need not be fed back, only the node alignment information may be fed back. For example, in the case that the base station directly designates N CSI feedback node sets for the terminal, the node selection information may be not needed. Besides the afore-mentioned two methods, the node alignment information may be fed back by indexing a permutation matrix and then signaling only the index of the permutation matrix.

Alternatively, the base station may directly designate a node preference order for the CSI feedback node set including N nodes for the terminal. In such case, the terminal need not transmit the node selection information and the node alignment information to the base station.

Next, a method of consisting CSI feedback information is described.

In an embodiment, when CSI feedback information is generated, CSI is measured with the number of nodes gradually increasing, e.g., in such a way as $\{RRH_1\} \rightarrow \{RRH_1, RRH_2\} \rightarrow \{RRH_1, RRH_2, RRH_3\} \ldots$ Accordingly, it is more efficient to feed back a CSI differential value rather than directly feeding back CSI for each node combination.

For example, in the case that only the highest-priority node $RRH_1$ is used, CQI value may be defined as follows:

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |

TABLE 1-continued

| CQI index | modulation | code rate × 1024 | efficiency |
|---|---|---|---|
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

There is not likely to be a large difference in CQI between when only the highest-priority node $RRH_1$ is used and when the highest-priority node $RRH_1$ and the second highest-priority node $RRH_2$ are used. Likewise, it does not likely that there is a big difference in CQI between when $\{RRH_1, RRH_2\}$ is used and when $\{RRH_1, RRH_2, RRH_3\}$ is used.

Accordingly, when generating CQI while continuing to add a node, the terminal preferably feeds back only a differential value of CQI instead of directly feeding back the CQI value. For example, assume that when $\{RRH_1\}$ is used CQI index is 5 in Table 1, and when $\{RRH_1, RRH_2\}$ is used, CQI index is 8 in Table 1. In such case, the terminal, instead of CQI index '8', may transmit only a differential value of CQI index, i.e., 3, as CQI for $\{RRH_1, RRH_2\}$. The same is true for when $\{RRH_1, RRH_2, RRH_3\}$ is used.

In the LTE system, when CQI for a subband selected by the terminal is fed back, a difference from CQI for a wideband is transmitted. In such case, Table 2 below may be used:

TABLE 2

| Differential CQI value | Offset level |
|---|---|
| 0 | ≤1 |
| 1 | 2 |
| 2 | 3 |
| 3 | ≥4 |

Further, the 3 bit spatial differential CQI value used for multi-code word transmission in the LTE system is given as follows:

TABLE 3

| Spatial differential CQI value | Offset level |
|---|---|
| 0 | 0 |
| 1 | 1 |
| 2 | 2 |
| 3 | ≥3 |
| 4 | ≤−4 |
| 5 | −3 |
| 6 | −2 |
| 7 | −1 |

Tables 2 and 3 may be reused or transformed before use for transmission of the CQI differential value.

In particular, when the rank value is fixed, in consideration of the fact that if a node is added, CQI has a higher chance of increasing, only positive CQI offset values may be used as in Table 4.

TABLE 4

| Spatial differential CQI value | Offset level |
|---|---|
| 0 | 0 |
| 1 | 1 |

TABLE 4-continued

| Spatial differential CQI value | Offset level |
| --- | --- |
| 2 | 2 |
| 3 | 3 |
| 4 | 4 |
| 5 | 5 |
| 6 | 6 |
| 7 | ≥7 |

TABLE 5

| Differential RI index | Differential RI value for $2^{nd}$ RRH | Differential RI value for $2^{nd}$ and $3^{rd}$ RRH |
| --- | --- | --- |
| 0 | 0 | 0 |
| 1 | 1 | 1 |
| 2 | 2 | 2 |
| 3 | 0 | 1 |
| 4 | 1 | 2 |
| 5 | 2 | 3 |

Upon transmission of CQI differential values, as the number of nodes increases, the CQI differential value is more likely to decrease. Accordingly, it may be specified that as the size of the node combination for CSI measurement gradually increases, the number of bits assigned to CQI differential feedback decreases.

For example, it may be specified that with respect to the highest-priority node $RRH_1$ four bit CQI information in Table 1 is fed back, when the second highest-priority node is combined (e.g., $\{RRH_1, RRH_2\}$), 3 bit CQI differential value is fed back, and when the third highest-priority node is added (e.g., $\{RRH_1, RRH_2, RRH_3\}$), 2 bit CQI differential value is fed back.

Similar to CQI, RI also may feed a differential value back. For example, in the case that RI=2 when only the highest-priority node $RRH_1$ is used, and RI=3 when both the highest-priority node and the second highest-priority node are used (i.e., $\{RRH_1, RRH_2\}$), as RI for a situation where, $\{RRH_1, RRH_2\}$ is used, only the differential value for the two RIs, that is, "1", may be fed back. In the LTE system, since the maximum rank is 8, RI uses three bits. However, in the case of feeding back a differential value, the number of bits used for RI decreases. In such case, the following is considered: as the number of nodes simultaneously transmitting signals to the terminal increase, rank would remain the same or increase, and the increment would gradually decrease.

Or, as the number of nodes simultaneously transmitting signals to the terminal increases in order to reduce complexity of the system, the increment of the rank to be considered may be limited. That is, as the nodes are added in such a way as $\{RRH_1\} \rightarrow \{RRH_1, RRH_2\} \rightarrow \{RRH_1, RRH_2, RRH_3\} \ldots$, the increment of the rank to be considered may be limited to a particular value which is less than 8. For example, upon addition of the nodes, when the rank is limited as i) remaining unchanged, or ii) being increased by 1, the differential value of RI may be represented as 1 bit. By such limitation, the feedback information amount decreases and the number of cases of the rank to be considered decreases, thus reducing calculation overheads.

Further, as the nodes increase in such a way as $\{RRH_1\} \rightarrow \{RRH_1, RRH_2\} \rightarrow \{RRH_1, RRH_2, RRH_3\} \ldots$, CSI differential values may be grouped into a table.

RI is described. Assume that the maximum number (M) of assignable nodes in the system is fixed to 3 and that upon generation of the CSI feedback, the maximum increment of the rank by addition of the nodes is limited to maximally 2 for the second highest-priority node ($RRH_2$) and is limited to maximally 1 for the third highest-priority ($RRH_3$). In such case, assume that when RI=a for the highest-priority node RRH1, RI=b for the highest-priority node and the second highest-priority node ($\{RRH_1, RRH_2\}$) and RI=c for $\{RRH_1, RRH_2, RRH_3\}$. In such case, b may be a, a+1, or a+2, and c may be b or b+1. Accordingly, the differential RI index which is a differential value of RI may be configured as follows:

That is, if when $\{RRH_1\}$ is used, RI is $RI_a$, when $\{RRH_1, RRH_2\}$ is used, RI is $RI_b$, and $\{RRH_1, RRH_2, RRH_3\}$ is used, RI is $RI_c$, differential values that may be possible between $RI_a$, $RI_b$, and $RI_c$ may be grouped into an indexed table, and the indexes alone may be transmitted, thus reducing the CSI feedback amount. This method may also apply to other types of CSIs, such as RI, PMI, CQI, or CPMI.

Figure 5:
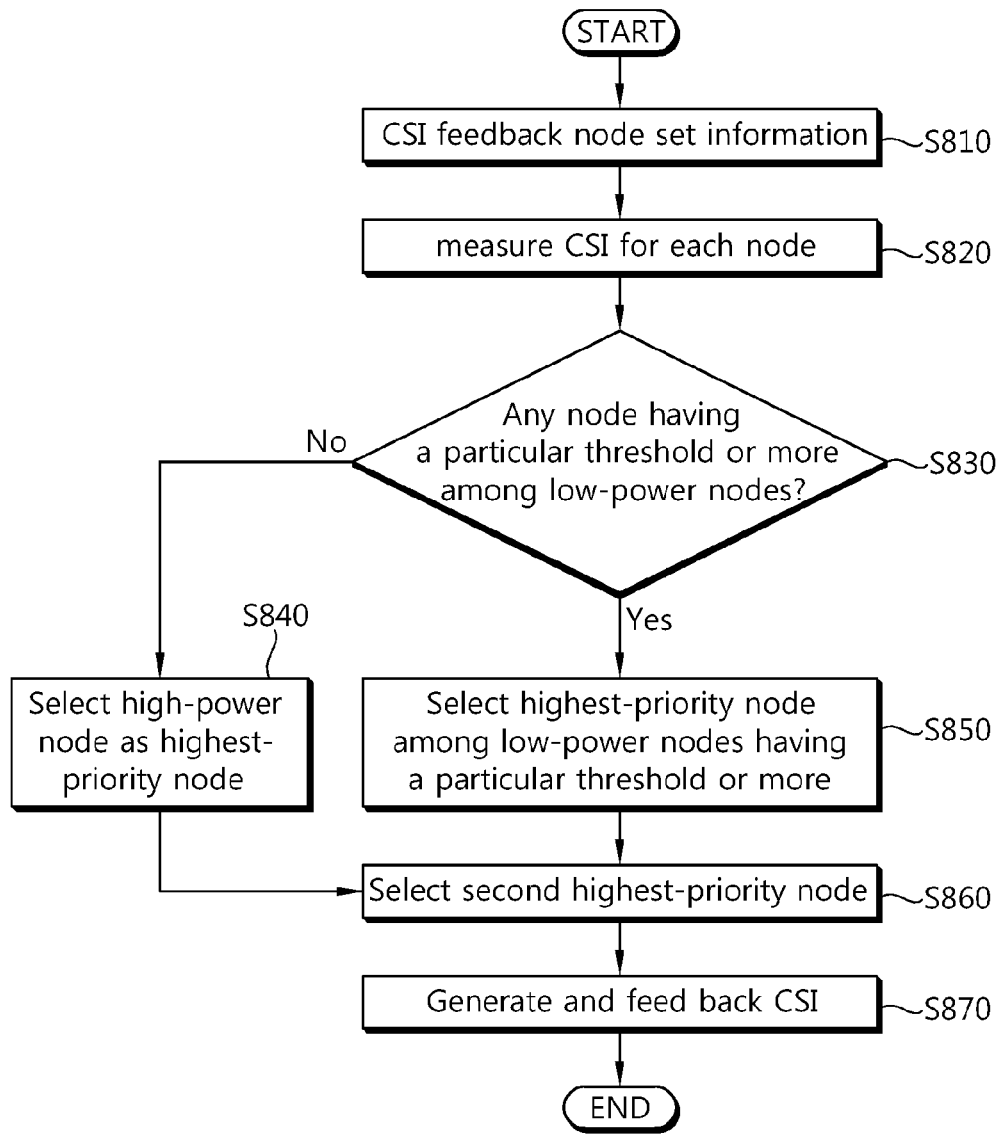
FIG. 5 illustrates a CSI feedback method according to an embodiment of the present invention.

FIG. 5 illustrates a CSI feedback method according to an embodiment of the present invention.

The terminal receives CSI feedback node set information from the base station (S810).

The terminal measures CSI for each of nodes indicated by the CSI feedback node set information (S820).

The terminal determines whether among the nodes there are nodes having a specific threshold or more (S830). If there are no nodes having the specific threshold or more, the high-power node is selected as the highest-priority node (S840). If among the low-power nodes, nodes are present that have the specific threshold or more, the highest-priority node is selected from the low-power nodes having the specific threshold or more (S850).

The nodes controlled by the base station may be divided into high-power nodes and low-power nodes. If the terminals may select their preferred nodes without any limitation, many terminals may select a high-power node as the highest-priority node. This means that completion for one node increases. Accordingly, the base station may force each or all of the terminals to preferentially select the highest-priority node among the low-power nodes.

The terminal preferentially selects the highest-priority node among the low-power nodes. Only when all of the low-power nodes show quality of a specific threshold or less, a high-power node may be selected as the highest-priority node. Such method may reduce traffic load of the high-power node. That is, load balancing may be achieved all over the nodes.

In steps S840 and S850 of FIG. 5, when the terminal selects the highest-priority node, the type of a node to be selected may be controlled or pre-designated by the base station. The type of the highest-priority node to be selected may be transferred to the terminal through an upper-level signal or DCI. When transferred by control information, it may be transmitted through a terminal-specific signal or cell-specific signal.

The low-power and high-power nodes may be distinguished with two types of nodes ID explicitly separated. Or, different types of reference signals transmitted by two types of nodes may be transmitted to distinguish the low-power nodes from the high-power nodes through the reference signals. The terminal may discern the nodes based on the type of RS used for CSI measurement of the low-power and high-power nodes. That is, CSI for the high-power nodes may be measured based on CRS or cell-specific CSI-RS, and CSI for low-power nodes may be measured based on node-specific CSI-RS.

In the latter case, NVCS (Nested Virtual Cell System) may be considered. In the NVCS, the low-power nodes transmit node-specific CSI-RSs separated for each node, and the high-power nodes transmit CRS but not CSI-RS. Or CRS and CSI-RS all may be transmitted.

The cell-specific CSI-RS and the node-specific CSI-RS respectively mean being cell-specific and node-specific from the point of view of a network, but does not mean forcing the terminal to set CSI-RS through the cell-specific or node-specific control information. As an example, the base station may set CSI-RS resources for the terminal based on the terminal-specific control information through the low-power and high-power nodes. In such case, the terminal-specific control information setting the CSI-RS resources may contain an indicator indicating the type of a node transmitting the CSI-RS resources (for example, one-bit indicator discerning the nodes between the high-power and low-power nodes), so that the terminal may discern the type of the node. As another example, the base station may set the CSI-RS resources or CRS for the terminal through the cell-specific control information with respect to the high-power nodes and the CSI-RS resources through the terminal-specific control information with respect to the low-power nodes, so that the terminal may distinguish the nodes according to the type of the nodes.

The terminal selects the second-highest node (S860). The terminal generates and feeds back CSI (S870).

Although in the embodiment for ease of description the nodes have been divided into the low-power and high-power nodes, the nodes may be divided into three or more different types. Also, the nodes may be separated according to a reference other than the transmission power. For example, a network service provider may arbitrarily separate the nodes into different types even though the nodes have the same transmission power in order to measure node load at a specific region and achieve load balancing. In such case, the terminal preferentially finds out the highest-priority node among a specific type of nodes.

Figure 6:
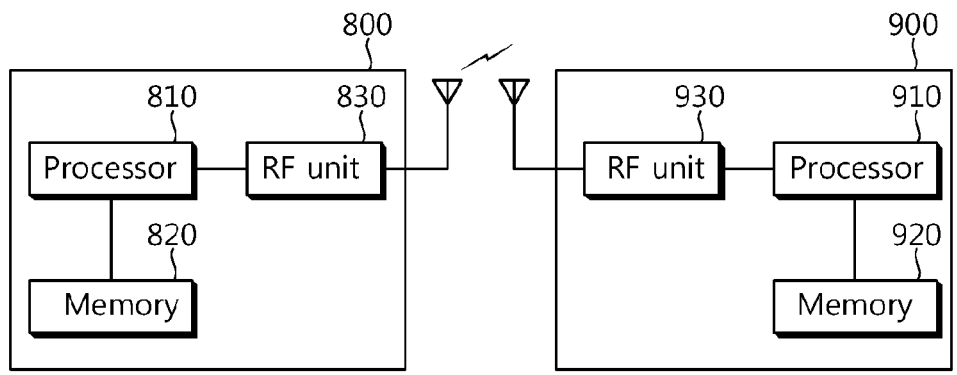
FIG. 6 is a block diagram illustrating a base station and a terminal according to an embodiment of the present invention.

FIG. 6 is a block diagram illustrating a base station and a terminal according to an embodiment of the present invention.

The base station 800 includes a processor 810, a memory 820, and a RF (Radio Frequency) unit 830. The base station 800 may control a plurality of nodes in a multi-node system. The processor 810 implements a suggest function, procedure, and/or method. Layers of a wireless interface protocol may be implemented by the processor 810. The processor 810 transmits information on the maximum number of assignable nodes and CSI feedback node set information. The processor 810 also controls the plurality of nodes and transmits a reference signal. Further, the processor 810 receives channel state information from the terminal 900 and then performs cooperative transmission through at least one node. The memory 820 is connected to the processor 810 and stores various types of information for driving the processor 810. The RF unit 830 is connected to the processor 810 and transmits and/or receives wireless signals.

The terminal 900 includes a processor 910, a memory 920, and a RF unit 930. The RF unit 930 is connected to the processor 910 and transmits and/or receives wireless signals. The processor 910 implements a suggested function, procedure, and/or method. For example, the processor 910 receives information on the maximum number of assignable nodes and CSI feedback node set information, measures a reference signal, generates channel state information, and then feeds back the channel state information. The method of generating the channel state information has been described above in connection with FIGS. 4 and 5. Layers of a wireless interface protocol may be implemented by the processor 910. The memory 920 is connected to the processor 910 and stores various types of information for driving the processor 910.

The processor 810 or 910 may include an ASIC (Application-Specific Integrated Circuit), other chipsets, a logic circuit and/or a data processing device. The memory 810 or 920 may include a ROM (Read-Only Memory), a RAM (Random Access Memory), a flash memory, a memory card, a storage medium, and/or other storing devices. The RF unit 830 or 930 may include a baseband circuit for processing wireless signals. In an embodiment, when implemented in software, the above-described method may be implemented in a module (procedure or function) for performing the above-described function. The module may be stored in the memory 820 or 920 or may be executed by the processor 810 or 910. The memory 820 or 920 may be positioned inside or outside the processor 810 or 910 and may be connected to the processor 810 or 910 through a known means. In the exemplary system, although the methods have been described in flowcharts including a series of steps or blocks, the inventive methods are not limited to the steps or order of the steps, and a step may be performed simultaneously with or in a different order from another step. It will be understood by one of ordinary skill that any other steps may be included in the methods or some steps may be omitted from the methods without departing from the scope of the invention.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

The invention claimed is:

1. A method of feeding back channel state information of a user equipment (UE) in a multi-node system including a plurality of nodes and a base station connected to each of the plurality of nodes, the base station controlling the plurality of nodes, the method comprising:
receiving a reference signal of N nodes, wherein N is a natural number equal to or more than 2;
aligning the N nodes in an order of preferring the N nodes based on a result of measuring the reference signal;
generating channel state information for the aligned nodes; and
transmitting the generated channel state information to the base station, wherein the channel state information is generated with respect to N node combinations configured from the aligned nodes, and wherein the N node combinations are obtained by adding next highest-priority nodes to a first node combination one by one, the first node combination consisting a highest-priority node among the aligned nodes.

2. The method of claim 1, wherein when N is 3, and node 1, node 2, and node 3 are aligned in an order of the node 1, the node 2, and the node 3, the N node combinations include {node 1}, {node 1, node 2}, and {node 1, node 2, and node 3}.

3. The method of claim 1, further comprising:
receiving channel state information (CSI) feedback node set information from the base station, the CSI feedback node set information indicating a node set to which the channel state information is generated, wherein the CSI feedback node set information directly indicates the N nodes or a value of N.

4. The method of claim 1, further comprising:
receiving information on the maximum number of assignable nodes from the base station, wherein the information on the maximum number of assignable nodes indicates the maximum number of nodes to which the UE can generate the channel state information.

5. The method of claim 1, wherein in channel state information for the N node combinations, channel state information for an n+1th node combination includes a differential value from channel state information for an nth node combination, wherein n is any one of 1 to N−1.

6. The method of claim 5, wherein the number of bits of a field for transmitting the channel state information for the n+1 th node combination is equal to or less than the number of a field for transmitting the channel state information for the nth node combination.

7. The method of claim 1, wherein in channel state information for the N node combinations, a differential value between channel state information for an n+1th node combination and channel state information for an nth node combination is configured as a predetermined table.

8. The method of claim 7, wherein the channel state information for the n+1th node combination and the channel state information for the nth node combination are transmitted as index values in the predetermined table.

9. The method of claim 1, wherein when the N nodes include a plurality of types, the UE selects as a highest-priority node any one of nodes having a signal characteristic of a predetermined threshold or more among a predetermined type of nodes of the plurality of types of nodes.

10. The method of claim 9, wherein the plurality of types of nodes are distinguished from each other based on transmission power of the nodes.

11. The method of claim 10, wherein the plurality of types of nodes include high-power nodes having relatively high transmission power and low-power nodes having relatively low transmission power, wherein the high-power nodes use a cell-specific reference signal common for all UEs in a cell, and the low-power nodes use a UE-specific reference signal applied to a particular UE.

12. The method of claim 1, wherein the channel state information includes at least one of a channel quality indicator (CQI) indicating channel quality, a pre-coding matrix index (PMI) providing information on a pre-coding matrix in codebook-based pre-coding, or a rank indicator (RI) which is information on the number of layers recommended by the UE.

13. A user equipment (UE) comprising:
an RF unit configured to transmit and receive a wireless signal; and
a processor connected to the RF unit, the processor configured to receive a reference signal of N nodes, wherein N is a natural number equal to or more than 2, to align the N nodes in an order of preferring the N nodes based on a result of measuring the reference signal, to generate channel state information for the aligned nodes, and to transmit the generated channel state information to the base station, wherein the processor is configured to generate the channel state information with respect to N node combinations configured from the aligned nodes, and wherein the N node combinations are obtained by adding next highest-priority nodes to a first node combination one by one, the first node combination consisting a highest-priority node among the aligned nodes.

* * * * *